United States Patent
Sung et al.

(10) Patent No.: US 9,870,196 B2
(45) Date of Patent: Jan. 16, 2018

(54) SELECTIVE ABORTING OF ONLINE PROCESSING OF VOICE INPUTS IN A VOICE-ENABLED ELECTRONIC DEVICE

(71) Applicant: Google Inc., Mountain View, CA (US)

(72) Inventors: Sangsoo Sung, Palo Alto, CA (US); Yuli Gao, Sunnyvale, CA (US); Prathab Murugesan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/723,324

(22) Filed: May 27, 2015

(65) Prior Publication Data

US 2016/0350070 A1    Dec. 1, 2016

(51) Int. Cl.
| | | |
|---|---|---|
| *G10L 15/00* | (2013.01) | |
| *G10L 15/16* | (2006.01) | |
| *G10L 21/00* | (2013.01) | |
| *G10L 25/00* | (2013.01) | |
| *G10L 15/04* | (2013.01) | |
| *G10L 15/26* | (2006.01) | |
| *H04N 7/14* | (2006.01) | |
| *G06F 3/16* | (2006.01) | |
| *H04L 29/08* | (2006.01) | |

(Continued)

(52) U.S. Cl.
CPC ............. *G06F 3/167* (2013.01); *G10L 15/22* (2013.01); *G10L 15/26* (2013.01); *G10L 15/30* (2013.01); *G10L 15/32* (2013.01); *H04L 67/02* (2013.01); *H04L 67/42* (2013.01); *G06F 17/30* (2013.01); *G10L 2015/223* (2013.01); *H04M 2250/74* (2013.01)

(58) Field of Classification Search
CPC ..... G10L 15/265; G10L 15/02; G10L 15/063; G10L 15/187; G10L 15/22; G10L 15/30; G11C 2207/16; G06F 17/289; G06F 17/2785; G06F 17/2735; H04M 3/53325; H04M 3/533; H04M 3/5307
See application file for complete search history.

(56) References Cited

U.S. PATENT DOCUMENTS

| | | |
|---|---|---|
| 5,857,099 A | 1/1999 | Mitchell |
| 6,421,607 B1 * | 7/2002 | Gee ................... G01C 21/3629 340/988 |

(Continued)

FOREIGN PATENT DOCUMENTS

| | | |
|---|---|---|
| WO | 9416435 A2 | 7/1994 |
| WO | 2006037219 A1 | 4/2006 |

(Continued)

OTHER PUBLICATIONS

International Search Report and Written Opinion of PCT U.S. Serial No. PCT/US16/033654 dated Jul. 19, 2016.

(Continued)

*Primary Examiner* — Anne T Thomas-Homescu
(74) *Attorney, Agent, or Firm* — Middleton Reutlinger (57) ABSTRACT

Online processing of a voice input directed to a voice-enabled electronic device is selectively aborted whenever it is determined that a voice input directed to the voice-enabled electronic device can be successfully processed locally by the device. Doing so may in some instances reduce the latency of responding to a voice input.

19 Claims, 7 Drawing Sheets

(51) Int. Cl.
  *H04L 29/06* (2006.01)
  *G10L 15/22* (2006.01)
  *G10L 15/32* (2013.01)
  *G10L 15/30* (2013.01)
  *G06F 17/30* (2006.01)

(56) References Cited

U.S. PATENT DOCUMENTS

| | | | |
|---|---|---|---|
| 6,442,520 B1 | 8/2002 | Buhrke | |
| 6,678,415 B1 | 1/2004 | Popat | |
| 6,751,595 B2* | 6/2004 | Busayapongchai | G10L 15/22 379/88.03 |
| 6,779,030 B1* | 8/2004 | Dugan | H04M 3/42136 379/221.08 |
| 6,856,960 B1* | 2/2005 | Dragosh | G10L 15/30 704/243 |
| 7,197,331 B2* | 3/2007 | Anastasakos | G10L 15/30 455/550.1 |
| 7,233,786 B1* | 6/2007 | Harris | H04L 29/06027 370/328 |
| 7,606,708 B2* | 10/2009 | Hwang | G10L 15/06 704/257 |
| 7,653,191 B1* | 1/2010 | Glasser | H04M 3/42229 379/201.1 |
| 7,689,420 B2* | 3/2010 | Paek | G10L 15/19 704/250 |
| 7,729,913 B1* | 6/2010 | Lee | G06F 17/30654 704/251 |
| 8,195,468 B2* | 6/2012 | Weider | G06F 17/30864 704/233 |
| 8,209,184 B1* | 6/2012 | Dragosh | G10L 15/30 704/231 |
| 8,396,710 B2* | 3/2013 | White | G10L 15/30 704/244 |
| 8,447,607 B2* | 5/2013 | Weider | G06F 17/30864 704/250 |
| 8,494,853 B1* | 7/2013 | Mengibar | G10L 15/065 704/233 |
| 8,949,130 B2* | 2/2015 | Phillips | G10L 15/30 382/190 |
| 9,172,803 B2* | 10/2015 | Bachran | H04M 3/493 |
| 2002/0042707 A1* | 4/2002 | Zhao | G06F 17/27 704/9 |
| 2002/0169600 A1* | 11/2002 | Busayapongchai | G10L 15/22 704/201 |
| 2003/0120493 A1* | 6/2003 | Gupta | G10L 15/063 704/270.1 |
| 2004/0044516 A1* | 3/2004 | Kennewick | G10L 15/22 704/5 |
| 2005/0027527 A1* | 2/2005 | Junkawitsch | G10L 15/20 704/243 |
| 2005/0043953 A1* | 2/2005 | Winterkamp | G10L 15/22 704/275 |
| 2005/0187771 A1 | 8/2005 | Gong | |
| 2006/0093998 A1* | 5/2006 | Vertegaal | G06F 3/011 434/236 |
| 2007/0142027 A1* | 6/2007 | Bushnell | H04M 3/4874 455/404.1 |
| 2007/0276651 A1 | 11/2007 | Bliss | |
| 2007/0288159 A1* | 12/2007 | Skelton | G01C 15/00 455/556.2 |
| 2009/0053681 A1* | 2/2009 | Shen | G09B 19/06 434/157 |
| 2009/0077191 A1* | 3/2009 | Bristow | H04L 12/5855 709/207 |
| 2009/0119009 A1* | 5/2009 | Dicke | G01C 21/30 701/533 |
| 2009/0210148 A1* | 8/2009 | Jayanthi | G01C 21/26 701/467 |
| 2009/0220926 A1 | 9/2009 | Rechlis | |
| 2010/0088100 A1* | 4/2010 | Lindahl | G10L 15/30 704/270.1 |
| 2010/0153335 A1* | 6/2010 | Esteve Balducci | G06Q 10/107 707/610 |
| 2010/0158218 A1* | 6/2010 | Dhawan | H04M 1/2478 379/88.18 |
| 2010/0172287 A1* | 7/2010 | Krieter | H04W 8/005 370/328 |
| 2010/0299376 A1* | 11/2010 | Batchu | G06F 21/6245 707/805 |
| 2011/0015928 A1 | 1/2011 | Odell et al. | |
| 2011/0044435 A1* | 2/2011 | Bachran | H04M 3/493 379/88.17 |
| 2011/0112827 A1* | 5/2011 | Kennewick | G10L 15/18 704/9 |
| 2011/0112921 A1* | 5/2011 | Kennewick | G06Q 30/0601 705/26.1 |
| 2011/0286586 A1* | 11/2011 | Saylor | H04M 3/493 379/88.13 |
| 2012/0089698 A1* | 4/2012 | Tseng | G06Q 10/101 709/217 |
| 2012/0179457 A1 | 7/2012 | Newman et al. | |
| 2012/0253799 A1* | 10/2012 | Bangalore | G10L 15/183 704/231 |
| 2013/0030802 A1 | 1/2013 | Jia et al. | |
| 2013/0132089 A1* | 5/2013 | Fanty | G10L 21/00 704/270 |
| 2013/0179154 A1* | 7/2013 | Okuno | G10L 15/22 704/10 |
| 2013/0246392 A1* | 9/2013 | Farmaner | G06F 17/30442 707/713 |
| 2013/0332162 A1* | 12/2013 | Keen | G10L 15/26 704/235 |
| 2014/0036022 A1* | 2/2014 | Croen | H04N 7/147 348/14.01 |
| 2014/0039893 A1 | 2/2014 | Weiner | |
| 2014/0058732 A1* | 2/2014 | Labsky | G10L 15/30 704/254 |
| 2014/0067392 A1* | 3/2014 | Burke | G10L 15/22 704/236 |
| 2014/0088731 A1* | 3/2014 | Von Hauck | H04W 12/06 700/14 |
| 2014/0129226 A1* | 5/2014 | Lee | G10L 15/04 704/254 |
| 2014/0169539 A1* | 6/2014 | Mumick | H04M 3/48 379/88.23 |
| 2014/0180697 A1 | 6/2014 | Torok | |
| 2014/0288936 A1* | 9/2014 | Cho | G10L 15/18 704/257 |
| 2014/0320284 A1* | 10/2014 | Messenger | A61B 5/0022 340/527 |
| 2014/0358544 A1 | 12/2014 | Printz | |
| 2015/0081630 A1* | 3/2015 | Linsalata | G06F 17/30578 707/617 |
| 2015/0120287 A1* | 4/2015 | Stern | G10L 15/183 704/231 |
| 2015/0120288 A1 | 4/2015 | Thomson et al. | |
| 2015/0120296 A1* | 4/2015 | Stern | G10L 15/30 704/236 |
| 2015/0133082 A1* | 5/2015 | Broch | H04M 1/72577 455/410 |
| 2015/0186892 A1* | 7/2015 | Zhang | G06Q 20/40145 705/44 |
| 2015/0254518 A1* | 9/2015 | Griffin | H04M 1/72552 382/229 |
| 2015/0255068 A1 | 9/2015 | Kim et al. | |
| 2015/0279352 A1* | 10/2015 | Willett | G10L 15/30 704/231 |
| 2015/0293509 A1* | 10/2015 | Bankowski | G05B 15/02 700/275 |
| 2015/0370787 A1 | 12/2015 | Akbacak | |
| 2015/0371628 A1 | 12/2015 | Kreifeldt | |

(56) References Cited

U.S. PATENT DOCUMENTS

2015/0373183 A1* 12/2015 Woolsey ........... H04M 1/72563
          348/14.08
2016/0042748 A1   2/2016 Jain

FOREIGN PATENT DOCUMENTS

| WO | 2009082684 A1 | 7/2009 | | |
|---|---|---|---|---|
| WO | 2009145796 A1 | 12/2009 | | |
| WO | 2014055076 A1 | 4/2014 | | |
| WO | 2014060054 A1 | 4/2014 | | |
| WO | 2014144579 A1 | 9/2014 | | |
| WO | WO 2015041892 A1 * | 3/2015 | ............. | G10L 15/22 |

OTHER PUBLICATIONS

Kumar Anuj et al., "Enabling the Rapid Development and Adoption of Speech-User Interfaces," Computer, IEEE, US, vol. 47, No. 1, Jan. 1, 2014, pp. 40-47.

Kuhn T. et al., "Hybrid in-car speech recognition for mobile multimedia applications," Vehicular Technology Conference, 1999 IEEE, May 20, 1999.

* cited by examiner

SELECTIVE ABORTING OF ONLINE PROCESSING OF VOICE INPUTS IN A VOICE-ENABLED ELECTRONIC DEVICE

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text (or voice-to-text) conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

The computing resource requirements of a voice-based user interface, e.g., in terms of processor and/or memory resources, can be substantial, and as a result, some conventional voice-based user interface approaches employ a client-server architecture where voice input is received and recorded by a relatively low-power client device, the recording is transmitted over a network such as the Internet to an online service for speech-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Particularly in mobile and automotive applications, continuous online connectivity may not be guaranteed at all times and in all locations, so a client-server voice-based user interface may be disabled in a client device whenever that device is "offline" and thus unconnected to an online service. Furthermore, even when a device is connected to an online service, the latency associated with online processing of a voice input, given the need for bidirectional communications between the client device and the online service, may be undesirably perceptible by a user.

SUMMARY

This specification is directed generally to various implementations that selectively abort online processing of a voice input directed to a voice-enabled electronic device whenever it is determined that a voice input can be successfully processed locally by the device. By doing so, the latency of responding to a voice input may be reduced in some instances.

Therefore, in some implementations, a method may receive a voice input with a voice-enabled electronic device, and in the voice-enabled electronic device, and responsive to receiving at least a portion of the voice input, initiate online processing of the at least a portion of the voice input by the online voice-based query processor; perform local processing of the at least a portion of the voice input to dynamically build at least a portion of a voice action prior to completely receiving the voice input with the voice-enabled electronic device; determine during the local processing whether the voice action can be completed by the local processing without data received from the online voice-based query processor; and in response to a determination that the voice action can be completed by the local processing without data received from the online voice-based query processor, abort online processing of the at least a portion of the voice input by the online voice-based query processor and completing building of the voice action with the local processing.

In some implementations, the voice-enabled electronic device may comprise a mobile device configured to communicate with the online voice-based query processor when in communication with a wireless network. In addition, in some implementations, performing the local processing of the portion of the voice input may include converting a digital audio signal of the voice input to text using a streaming voice to text module of the voice-enabled electronic device, where the streaming voice to text module dynamically generates a plurality of text tokens from the digital audio signal, and dynamically building the portion of the voice action from at least a portion of the plurality of text tokens using a streaming semantic processor of the voice-enabled electronic device.

In some implementations, initiating online processing may include sending data associated with the voice input to the online voice-based query processor. In some of such implementations, sending the data may comprise sending at least a portion of a digital audio signal of the voice input, where the online voice-based query processor is configured to perform voice to text conversion and semantic processing of the portion of the digital audio signal to generate an online action for the voice input. In other of such implementations, performing the local processing of the portion of the voice input may include generating a plurality of text tokens from a digital audio signal of the voice input, where sending the data may comprise sending at least a portion of the plurality of text tokens to the online voice-based query processor, and where the online voice-based query processor is configured to perform voice to text conversion and semantic processing of the portion of the digital audio signal to generate an online action for the voice input.

Further, in some implementations, aborting online processing of the portion of the voice input by the online voice-based query processor may include sending data to the online voice-based query processor to terminate online processing of the portion of the voice input by the online voice-based query processor. In other implementations, aborting online processing of the portion of the voice input by the online voice-based query processor may include disregarding a response received from the online voice-based query processor. In still other implementations, aborting online processing of the portion of the voice input by the online voice-based query processor may include bypassing sending of data associated with the voice input to the online voice-based query processor.

In further implementations, determining during the local processing whether the voice action can be completed by the local processing without data received from the online voice-based query processor may include determining whether an action requested by the voice input can be performed locally in the voice-enabled electronic device. In addition, some implementations may further include, in response to a determination that the voice action cannot be completed by the local processing without data received from the online voice-based query processor deferring completing building of the voice action with the local processing until reception of a response from the online voice-based query processor completing building of the voice action using data from the response. Some such implementations may also include, in response to the determination that the voice action cannot be completed by the local processing without data received from the online voice-based query processor, querying the online voice-based query processor for the data.

Some implementations may also include completing building of the voice action with the local processing, and thereafter verifying the voice action based upon data received from the online voice-based query processor. In some such implementations, verifying the voice action may include correcting the voice action in response to a failure to verify the voice action based upon the data received from the online voice-based query processor.

In addition, some implementations may include an apparatus including memory and one or more processors operable to execute instructions stored in the memory, where the instructions are configured to perform any of the aforementioned methods. Some implementations may also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, online processing of a voice input directed to a voice-enabled electronic device is selectively aborted whenever it is determined that the voice input can be successfully processed locally by the device. Further details regarding selected implementations are discussed hereinafter. It will be appreciated however that other implementations are contemplated so the implementations disclosed herein are not exclusive.

Example Hardware and Software Environment

Figure 1:
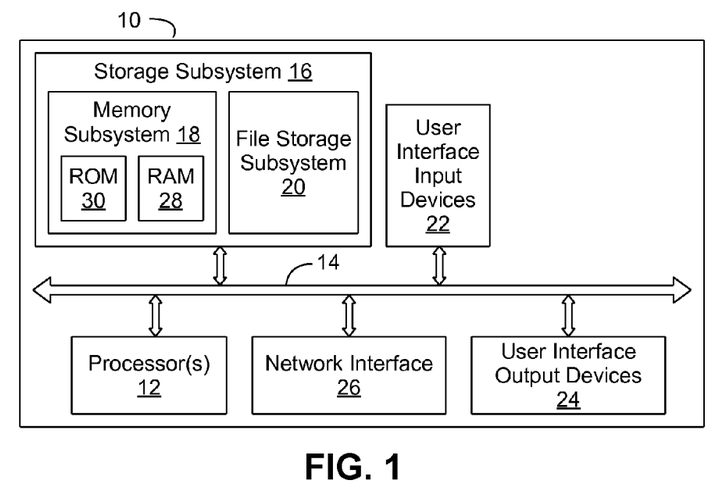
FIG. 1 illustrates an example architecture of a computer system.

Now turning to the Drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Distributed Voice Input Processing Environment

Figure 2:
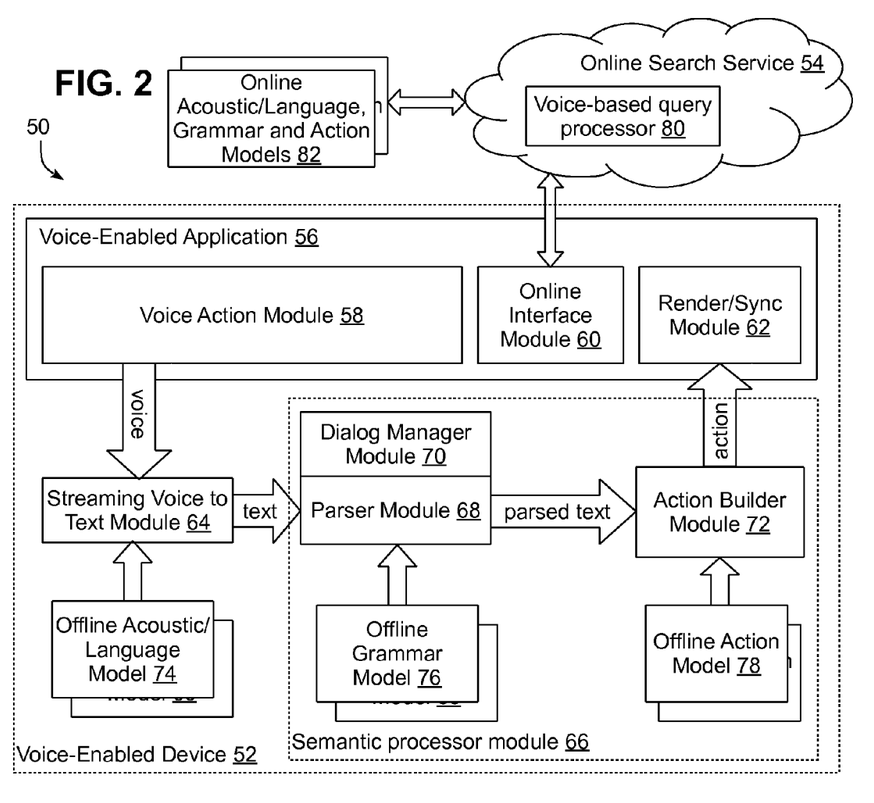
FIG. 2 is a block diagram of an example distributed voice input processing environment.

FIG. 2 illustrates an example distributed voice input processing environment 50, e.g., for use with a voice-enabled device 52 in communication with an online service such as online search service 54. In the implementations discussed hereinafter, for example, voice-enabled device 52 (also referred to herein as a voice-enabled electronic device) is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online search service 54 in some implementations may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc. In other implementations, an online system need not necessarily handle searching, and may be limited to handling voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled application (or "app") 56, which in some implementations may be a search application. In other implementations, voice input may be handled within an operating system or firmware of a voice-enabled device. Application 56 in the illustrated implementation includes a voice action module 58, online interface module 60 and render/synchronization module 62. Voice action module 58 receives voice input directed to the application and coordinates the analysis of the voice input and performance of one or more actions for a user of the voice-enabled device 52. Online interface module 60 provides an interface with online search service 54, including forwarding voice input to service 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online search service 54, e.g., whenever a response or action affects data maintained for the user in the online search service (e.g., where voice input requests creation of an appointment that is maintained in a cloud-based calendar).

Application 56 relies on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as tokens). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder.

Action builder module 72 receives the parsed text from parser module 68, representing a voice input interpretation and generates an action along with any associated parameters for processing by module 62 of voice-enabled application 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online search service 54.

Furthermore, online search service 54 generally includes complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computationally resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input.

Figure 3:
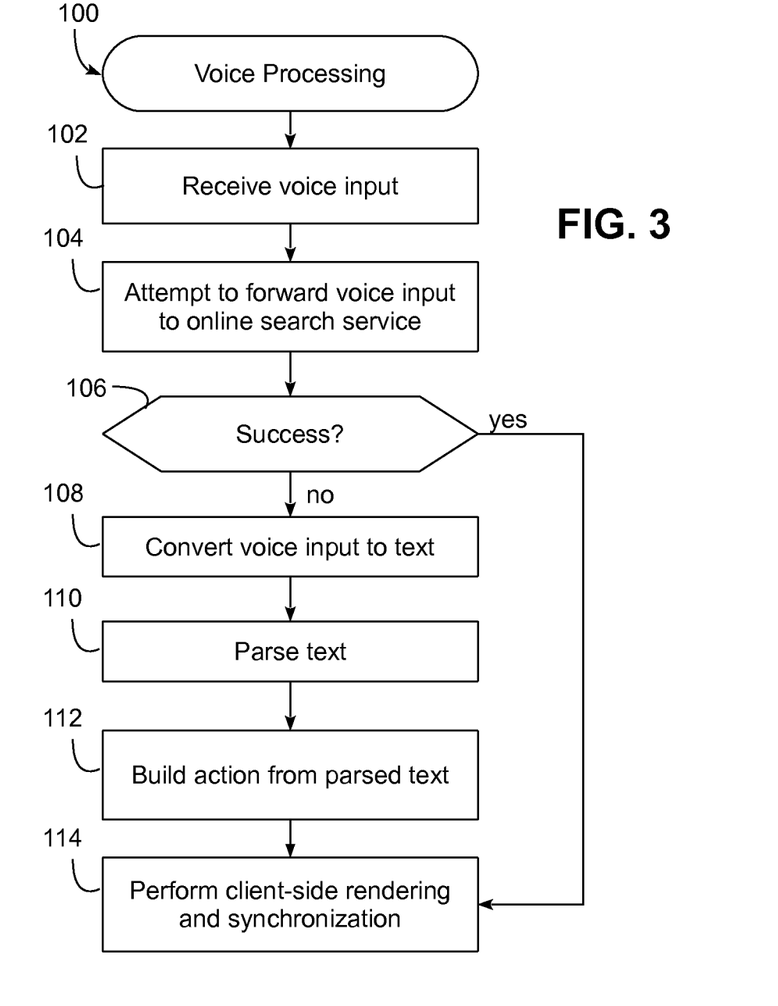
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to the lack of connectivity or the lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Selective Aborting of Online Processing of Voice Inputs in a Voice-Enabled Electronic Device As noted above, in some implementations, online processing of a voice input directed to a voice-enabled electronic device is selectively aborted whenever it is determined that a voice input can be successfully processed locally by the device to reduce the latency of responding to a voice input. Local processing functionality in the voice-enabled electronic device, e.g., as may be implemented within an offline voice to text module and an offline semantic processor (or any comparable functionality), may implement a streaming architecture to dynamically build at least a portion of a voice action from a voice input prior to the entire voice input being received, i.e., while a user is still speaking. Thus, prior to a complete voice input being received, the local processing may determine in some instances that the voice action can be completed without the need for interaction with an online service such as an online voice-based query processor. In such instances, processing of the voice input by the online service may be prematurely aborted, thereby avoiding the need to wait for a response from the online service, and resulting in the entire action being processed locally on the device and with reduced latency.

It will be appreciated that various voice-enabled electronic devices may rely to different extents on online and offline functionality to implement a voice-based user interface. Some devices, for example, may prioritize the use of online services to perform many of the operations associated with processing voice input, in part because online voice-based query processors are generally capable of devoting comparatively greater processing resources to handle voice-based queries. One of the functions that may be performed by an online service is semantic processing, which processes text elements (also referred to as tokens) generated from digital audio data to attempt to determine an action that is being requested by a user via a voice-based query. In some instances, a digital audio signal may even be provided to an online service such that both semantic processing and voice to text conversion are performed in remotely from the device.

Due to the potential for connectivity issues with such devices, as well as the general latency that may be experienced even when connectivity issues are not present, it may also be desirable in some instances to incorporate local or offline processing functionality, including both voice to text and semantic processing functionality, within a voice-enabled electronic device. In some instances, voice inputs may still be forwarded to an online service whenever a connection exists, and the results of the online service may be used whenever connectivity is present, leaving local processing serving primarily in a backup role, and handling voice inputs only in circumstances where no network connectivity exists.

As noted above, voice-enabled electronic devices in some implementations may also incorporate streaming architectures that dynamically build actions from voice inputs as users speak, rather than waiting until a complete voice input has been received before attempting to derive a meaning from the voice input. It has been found that in such implementations the streaming architectures employed by such devices may be leveraged to identify instances where voice inputs can be processed locally and without the need to wait for data from an online service, such that online processing of voice input may be proactive aborted. In many instances, a decision to selectively abort online processing may be made prior to completely processing a voice input, and in some instances, the decision may be made prior to a complete voice input being spoken by a user.

As an example, certain tasks, such as creating appointments, events, to do's, reminders, etc., may be performed locally on some mobile devices without any interaction with an online service (though later synchronization with an online database may still be performed). It has been found that, through the use of a streaming architecture, some of these tasks can be recognized even prior to a complete voice input by a user. For example, if a user speaks the phrase "set a reminder for 5:00 pm tomorrow to pick up milk," the fact that a reminder will need to be created is known as soon as the user speaks "set a reminder," so in such a circumstance, it may be desirable to abort any initiated online processing as soon as the phrase "set a reminder" is processed, and complete building of an action (i.e., complete the creation of the reminder) using local processing functionality. By doing so, further processing by an online service may be avoided, reducing both processing and communication costs, and additionally the need to wait for an online service to return a complete action based upon the full voice input is avoided, reducing the latency of completing the action.

In this regard, aborting online processing may be implemented in various manners in different implementations. For example, online processing of a voice input may be aborted in some instances by sending data to the online service (e.g., to an online voice-based query processor of the online service) to terminate remote or online processing by the online service. In other instances, online processing of a voice input may be aborted by disregarding a response received from the online service after initial online processing of the voice input has been initiated from the voice-enabled electronic device (e.g., after a first portion of the voice input has been forwarded to the online service for processing). In still other instances, online processing of a voice input may be aborted by bypassing a sending of data associated with the voice input to the online service, e.g., where portions of the voice input are streamed to the online service as they are received by a device.

Further, in some instances, multiple types of aborting may be implemented, e.g., based upon how quickly a determination may be made that a voice input can be successfully processed locally by a voice-enabled electronic device. Thus, if a determination is made prior to sending a portion of a voice input to an online service, a request that would otherwise be forwarded to the online service to process that portion of the voice input may be bypassed, and if the determination is made subsequent to sending the portion of the voice input to the online service, a request may be sent to the online service to discontinue processing of the voice input and/or any responses received from the online service may be ignored.

In addition, within the context of the disclosure, "completing" an action may refer to performing those steps and/or operations that are requested by a user via a voice input. Completing an action may also include completing the construction of a voice action object and performing the action specified by the voice action object. In some instances, completion of an action may occur only locally (referred to herein as a local completion), and in some instances, completion of an action may also occur remotely (referred to herein as a remote completion), e.g., in the online service and/or in one or more other devices associated with the user's voice-enabled electronic device, as might be the case where a user has several devices linked to the same account. In some instances, a local completion may be accompanied by a later synchronization with an online service, e.g., where a reminder or event is created locally on a user's device, and is later synchronized with an online calendar account. In such an instance, the creation of the reminder on the device may still be considered to represent completion of the action even though later synchronization occurs. In other implementations, completing an action may include fully building a voice action object and returning the completed voice action object to another module in a voice-enabled electronic device for further handling.

Figure 4:
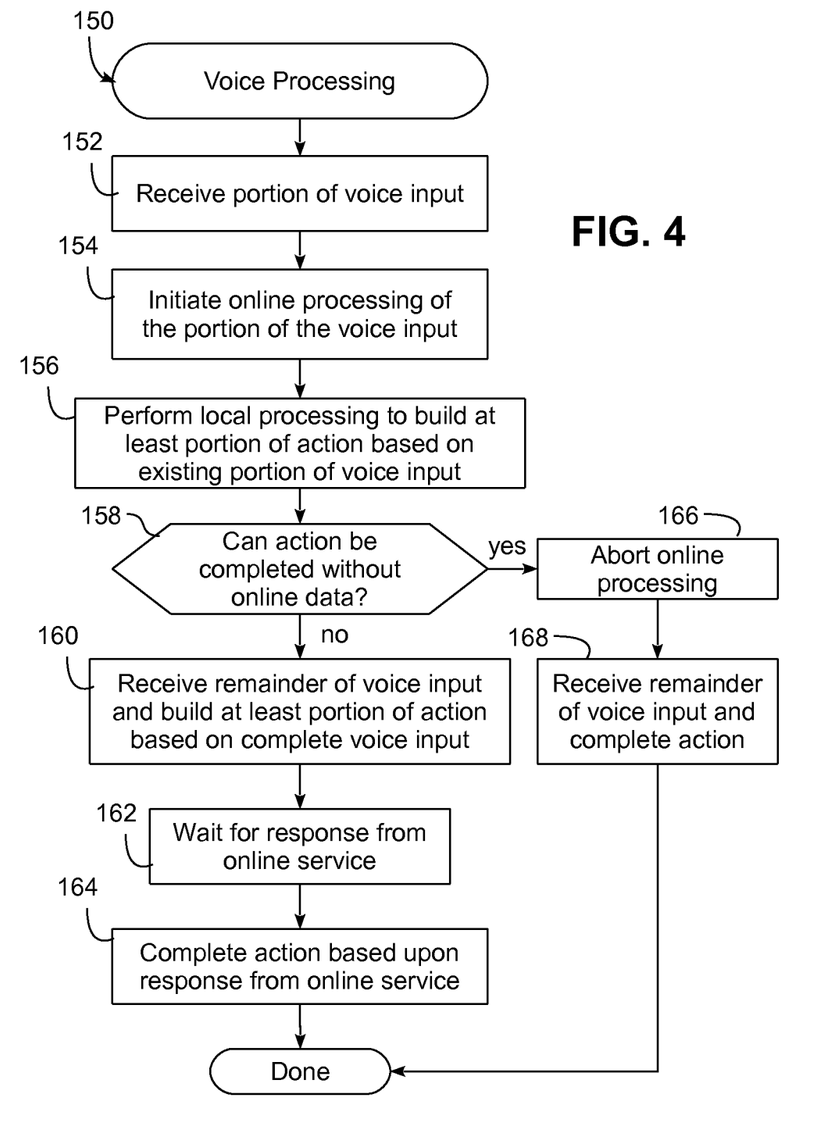
FIG. 4 is a flowchart illustrating an example method of selectively aborting online processing of a voice input using the environment of FIG. 2.

FIG. 4 illustrates one example implementation of a voice processing routine 150 for use in selectively aborting online processing of a voice input in the environment of FIG. 2. In this implementation, in block 152 at least a portion of a voice input (e.g., a digital audio signal representative of at least a portion of a spoken question or command) is received by a voice-enabled electronic device (e.g., a mobile device coupled to an online service over a wireless network). Responsive to receiving the portion of the voice input, online processing of the portion of the voice input by the online service (e.g., an online voice-based query processor thereof) may be initiated in block 154. In some implementations, for example, online processing may be initiated by forwarding a request to the online service including a portion of the voice input. In other implementations, e.g., where voice to text conversion is performed locally and online processing is used to perform semantic processing, online processing may be initiated by forwarding one or more text tokens generated by voice to text module 64 to the online service. In still other implementations, initiating online processing may include forwarding a request that notifies the online service to expect to receive future requests including data related to a voice input.

In addition, local processing of the portion of the voice input may be performed by the voice-enabled electronic device to dynamically build at least a portion of a voice action based upon the existing portion of the voice input (block 156). In this implementation, a streaming architecture is used, and as such, block 156 may be initiated prior to completely receiving the voice input with the voice-enabled electronic device. Also, in this regard, "dynamic building" may be considered to include building of a voice action progressively as additional portions of a voice input are received, and thus prior to reception of a complete voice input. Thus, for example, dynamic building may result in the generation of a partial voice action that is refined and supplemented with additional information as more of the voice input is processed.

Next, in block 158, a determination may be made as to whether the voice action can be completed locally (e.g., by the local processing functionality implemented in the voice-enabled electronic device) without data received from the online service. Such a determination may be made based upon local analysis of the voice action, and generally prior to completely processing the voice input.

For example, a voice action may include an action type and/or command that, once determined, may be of a type that is known to always be capable of being processed locally, e.g., for some device settings, some types of reminders, etc. Also, some voice actions may include one or more parameters that, once specified in a voice input and processed locally, render a partially-built voice action capable of being completed locally. Thus, for example, if a user speaks the phrase "set a reminder for 5:00 pm tomorrow to pick up milk," as soon as the word "tomorrow" is spoken, it may be ascertained that the voice action is a time-based reminder, and that the time and date parameters are resolvable locally, so regardless of whatever the user selects as the text for the reminder, the voice action can be completed locally. In other implementations, other factors, which may be particular to the specific voice action and/or parameters associated therewith, may be used to determine when a partially-built voice action is capable of being completed online, and as such, the examples presented herein are not exclusive.

Next, if a determination is made in block 158 that the action cannot be completed without online data, control passes to block 160 to receive the remainder of the voice input and build at least a portion of the voice action based upon the complete voice input. It will be appreciated that in some instances, the full voice action may be built in block 160; however, in some instances, online data may be required to fully build a voice action, so upon completion of block 160, a voice action may still be partially-built. In some instances, block 160 may also issue a query to the online service to retrieve any additional data determined to be needed for completion of the action.

Next, in block 162, routine 150 waits for a response from the online service to be received (block 162), and once the response is received, the voice action is completed using data received from the online service (block 164). In some instances, block 164 may supplement the locally-built voice action with online data, while in other instances, block 164 may simply utilize a voice action built by the online service (referred to herein as an online action) and discard the locally-built voice action. In still other instances, the locally-built voice action may be verified using the online data (e.g., an online action) and updated or corrected in the event of a failure to verify the locally-built voice action due to one or more discrepancies detected in the action. Processing of the voice input is then complete.

Returning to block 158, if a determination is made that the voice action can be completed locally and without online data, control instead passes to block 166 to abort online processing, e.g., in any of the manners discussed above. Block 168 then receives the remainder of the voice input (unless all of the voice input is already received), locally processes the remainder of the voice input, and completes the action locally, and without the use of any online data. Processing of the voice input is then complete. It will be appreciated that in some instances, a locally completed action may nonetheless be verified by online data if the online service returns data after the voice action has been completed.

Now turning to FIGS. 5-10, another example implementation is disclosed for processing voice input in device 50 of FIG. 2 using a streaming architecture. In particular, a number of routines executable by voice action module 58, streaming voice to text module 64 and sematic processor module 66 are disclosed.

Figure 5:
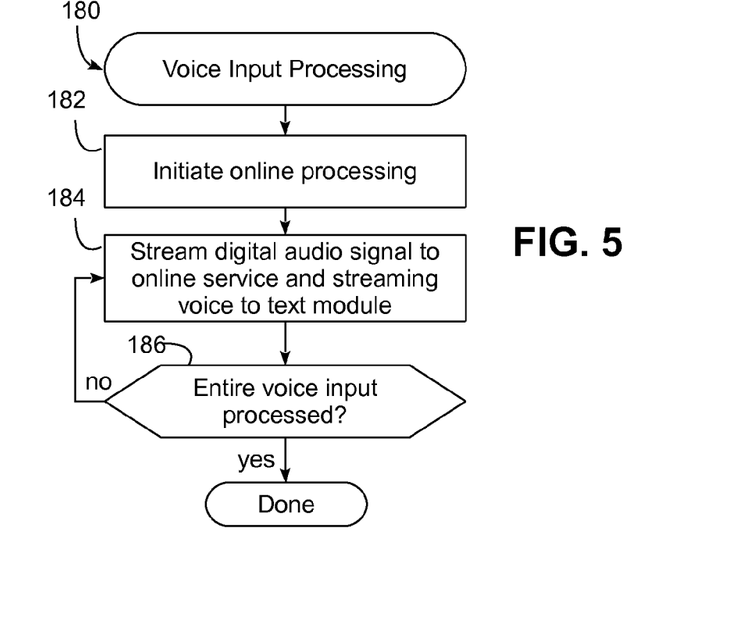
FIG. 5 is a flowchart illustrating another example method of processing a voice input using the environment of FIG. 2.

FIG. 5, for example, illustrates an example voice input processing routine 180 executed by voice action module 58 in response to receipt of at least a portion of a voice input. Routine 180 begins in block 182 by initiating online processing, e.g., by sending a request to the online service, e.g., to voice-based query processor 80 of online search service 54, indicating that a voice unit will be forthcoming from the device. Next, in block 184, digital audio data associated with a first portion of the voice input is streamed both to the online service and to the offline voice to text module (streaming voice to text module 64). Block 186 determines whether the entire voice input has been processed, and if not, returns control to block 184 to stream additional digital audio data to the online service and to the offline voice to text module. Once the entire voice input has been processed, routine 180 is complete.

It will be appreciated that in some implementations, online processing may be initiated by sending the digital audio data for the first portion of the voice input to the online service, whereby block 182 may omitted. In addition, in some implementations, the rates at which digital audio data is streamed to the online service and to the offline voice to text module may differ, and in some instances, digital audio data may not be streamed to the online service until the entire voice input is received. In still other implementations, voice to text conversion may be performed locally such that rather than streaming digital audio data to the online service, text tokens output by the voice to text module are streamed to the online service.

Figure 6:
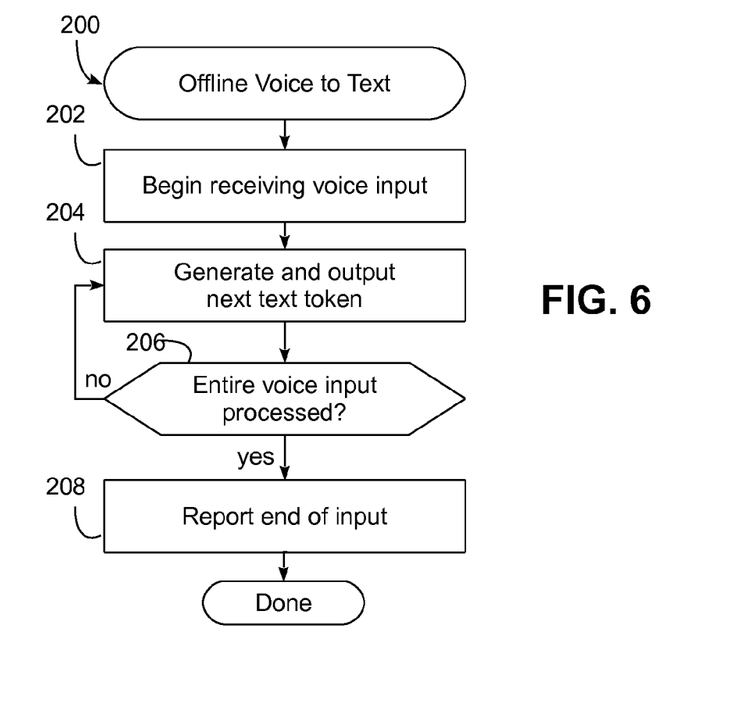
FIG. 6 is a flowchart of an example offline voice to text routine executed by the streaming voice to text module referenced in FIG. 2.

FIG. 6 next illustrates an example offline voice to text routine 200 executed by streaming voice to text module 64. As noted above, module 64 receives digital audio data representative of portions of a voice input from voice action module 58, and as such, routine 200 begins in block 202 by beginning to receive voice input from module 58. Block 204 generates and outputs text tokens (e.g., words and/or phrases) recognized in the digital audio data of the voice input, and block 206 determines whether an entire voice input has been processed, e.g., when no further digital audio data of the voice input remains unprocessed. While more digital audio data remains unprocessed, block 206 returns control to block 204 to generate additional text tokens, and when the entire voice input has been processed, block 206 passes control to block 208 to report the end of the voice input, e.g., to semantic processor module 66. In other implementations, the end of voice input may instead be reported by voice action module 58 or other functionality in the device. Routine 200 is then complete.

Figure 7:
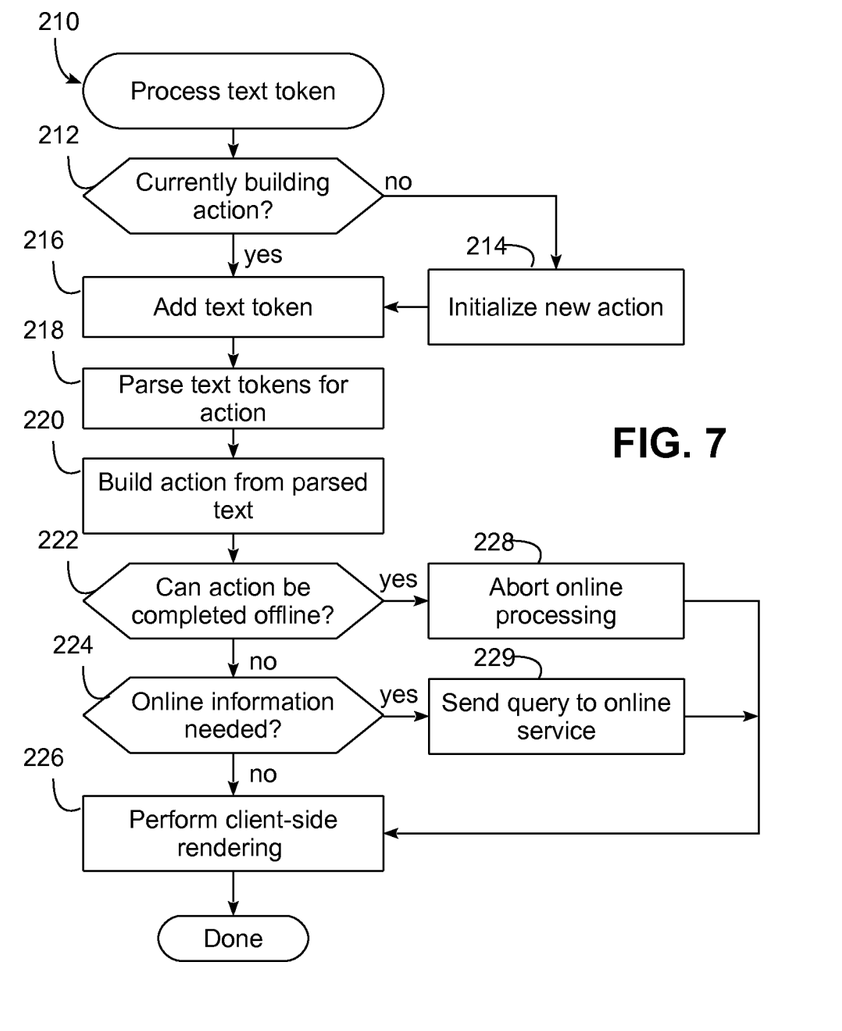
FIG. 7 is a flowchart of an example process text token routine executed by the semantic processor module referenced in FIG. 2.

FIG. 7 next illustrates an example process text token routine 210 executed by semantic processor module 66 in response to receiving a text token from streaming voice to text module 64. Routine 210 begins in block 212 by determining whether module 66 is currently building a voice action. If not, control passes to block 214 to initialize a new action object. After a new action object is initialized in block 214, or if block 212 determines that an action is already currently in the process of being built, block 216 adds the text token to a set of text token associated with the action. Block 218 parses the text tokens for the action and block 220 attempts to build the action from the parsed text. As noted above, in the illustrated implementation a streaming architecture is employed that attempts to progressively and dynamically build an action based upon the information currently available to the semantic processor module. As such, blocks 218 and 220 in some implementations may build, revise, refine, revise, correct, etc. an action as additional text tokens are supplied to the semantic processor module. Further, blocks 218 and 220 may in some implementations determine what action is being requested, determine the values of one or more parameters for the action, and even determine when additional data may be needed in order to complete the action. For example, if an action is based in part on a location, e.g., a request to make a restaurant reservation, blocks 218 and 220 may determine that a list of restaurants near the current location of the device and their availabilities are needed in order to complete the action.

Next, block 222 determines whether, based upon the current information available, the action can be completed offline, i.e., without data from the online service. If the action cannot be completed offline, or if insufficient data exists to make the determination, control passes to block 224 to determine if any online information is needed in order to complete the action (e.g., based upon the aforementioned dynamic building of the action in blocks 218 and 220). If not, control passes to block 226 to perform client-side rendering on the device. For example, client-side rendering may include displaying the text spoken by the user on a display of the device, altering previously-displayed text based upon an update to the partially-built action resulting from the text token being processed, or other audio and/or visual updates as may be appropriate for the particular device. Routine 210 is then complete for that text token.

Returning to block 222, if it is determined that the action can be completed offline, control passes to block 228 to abort online processing, e.g., by notifying the online service or setting a flag or other indicator that indicates when to disregard a response from the online service and/or when to bypass sending additional data (e.g., additional digital audio data or text tokens from the voice input) to the online service. Control then passes to block 226 to complete processing of the text token by performing client-side rendering.

Returning to block 224, if a determination is made that additional online information is needed in order to complete the action, block 224 sends a query to the online service to request the additional information (block 229). Control then passes to block 226 to complete processing of the text token by performing client-side rendering, and routine 210 is complete.

Figure 8:
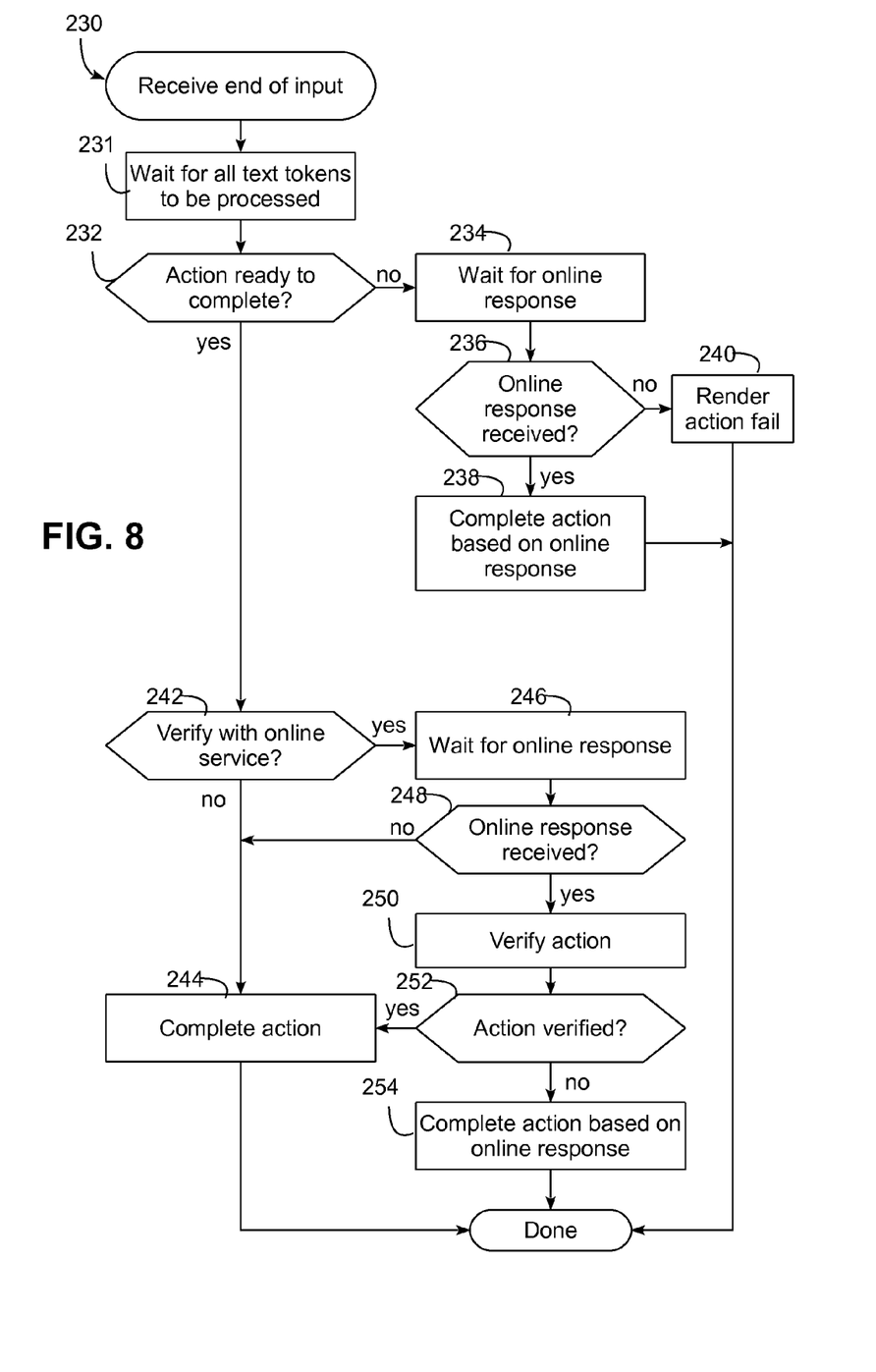
FIG. 8 is a flowchart of an example receive end of input routine executed by the semantic processor module referenced in FIG. 2.

FIG. 8 next illustrates an example receive end of input routine 230 that may be executed by semantic processor module 66 in response to receipt of an end of input indication (e.g., as generated in block 208 of FIG. 6). Routine 230 begins in block 231 by waiting (if necessary) for all text tokens to complete processing by routine 210, indicating that the semantic processor has processed all text tokens for the voice input. Block 232 then determines whether the action is ready to complete as a result of local processing. In some implementations, an action may be determined to be ready to complete if it is determined that after local processing no data is needed from the online service in order to complete the action. An action may be ready to complete if online processing has been aborted; however, in some instances, even actions that were not determined to meet the criterion for aborting online processing may nonetheless be ready to complete in the event that further local processing determined that no additional data was needed from the online service.

If not, control passes to block 234 to wait for a response from the online service, as building of the action by the local processing implemented in modules 64 and 66 was unable to complete, so data from the online service may be used to complete the action. The response from the online service may represent, for example, an online action built by the online service, or the response may represent any additional data requested by block 229 in one or more iterations of routine 210 of FIG. 7. Block 236 determines whether the online response has been received within an appropriate time, and if so, passes control to block 238 to complete the action based upon the data provided by the online response. For example, if the online response includes an online voice action, block 238 may complete the action by performing the operations specified by the online voice action. Otherwise, if the online response includes additional information requested by device, block 238 may complete the action by incorporating the additional information into the partially-built action built by semantic processor module 66 to generate a fully-built voice action.

Once the action is completed in block 238, routine 230 is complete. In addition, returning to block 236, if no response is received in a timely manner, control passes to block 240 to render to the user a failure in the action, e.g., by notifying the user that the requested action was not completed, and terminating routine 230.

Returning to block 232, if the action is determined to be ready to complete, control passes to block 242 to determine whether the action should be verified with the online service. If no verification is needed, control passes to block 244 to complete the action based upon the local processing, and routine 230 is complete. In some implementations, for example, it may be desirable to incorporate a setting that performs a verification of a locally-built voice action by the online service. In other implementations, however, no such setting may be used, and as such, block 242 and blocks 246-254 discussed hereinafter may be omitted. In still other implementations, verification may be performed asynchronously once an online response is received, even after the action has been completed based upon the local processing.

If verification is needed, block 242 passes control to block 246 to wait for an online response incorporating an online action or other data that may be used to verify the locally-built voice action. Block 248 determines whether the online response was received in a timely manner, and if so, passes control to block 250 to verify the action. Verification may include in some implementations comparing a locally-built voice action with a comparable action built by the online service and correcting or modifying the locally-built voice action to address any discrepancies discovered therebetween. Block 252 determines whether the action was verified, and if so, passes control to block 244 to complete the locally-built action. If not, however, control passes to block 254 to complete the action based on the online response, e.g., using an online voice action returned by the online service, or by correcting, updating or supplementing the locally-built action with data from the online service. Once the action is completed, routine 230 is then complete.

Figure 9:
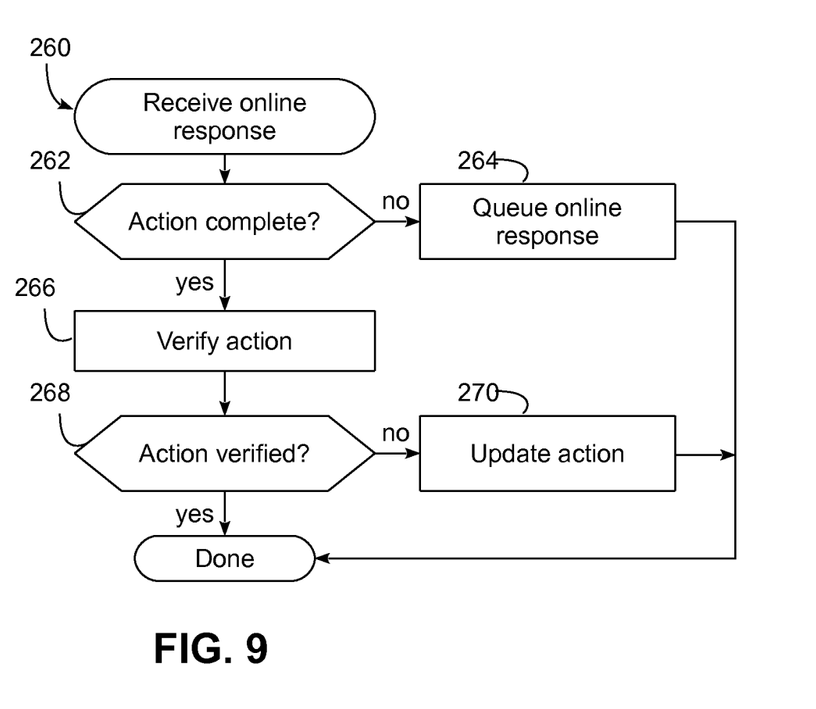
FIG. 9 is a flowchart of an example receive online response routine executed by the semantic processor module referenced in FIG. 2.

FIG. 9 next illustrates an example receive online response routine 260 that may be executed by semantic processor module 66 or another module in the voice-enabled electronic device to process responses received from the online service. Routine 260 is initiated when an online response is received, and block 262 determines whether the action associated with the online response is complete. If not, control passes to block 264 to queue the online response such that the response may be accessed when needed by the semantic processor module, e.g., in block 234 or block 246 of FIG. 8. It will be appreciated that in some implementations, a queued response that is associated with an action for which online processing has been aborted may also be discarded or ignored.

If the action associated with the online response is complete, block 262 passes control to block 266 to verify the action, similar to block 250 of FIG. 8. Block 264 determines whether the action was verified, and if so, terminates routine 260 as no further processing is needed. If not, however, block 268 passes control to block 270 to update or correct the action as appropriate, similar to blocks 252 and 254 of FIG. 8. Unlike block 254, however, block 270 may also perform additional operations based upon the fact that the action has already been completed and may have already changed the operating state of the device. Updating or correcting the action may therefore also involve correcting any improper operations performed by the locally-built operations, and in some implementations, notifying the user that a change was made. In other implementations, however, no user notification may be performed. In still other implementations, no verification may be performed in routine 260, and any online response received for a completed action (e.g., a completed action for which online processing has been aborted) will simply be ignored. Of note, however, even when verification is performed, the verification is generally performed after the action has been allowed to complete, so the latency that would otherwise be required to receive the online response and perform the verification is otherwise avoided for a locally-built action for which online processing has been aborted.

Figure 10:
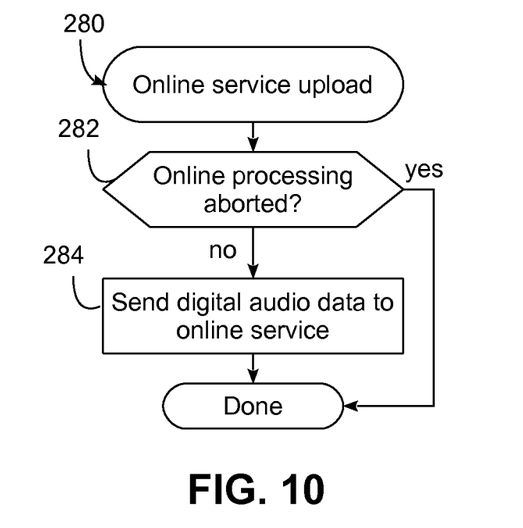
FIG. 10 is a flowchart of an example online service upload routine executed by the voice action module referenced in FIG. 2.

FIG. 10 next illustrates an example online service upload routine 280 that may be executed by the voice action module 58, e.g., in connection with streaming digital audio data from a voice input to an online processor as discussed above in connection with block 184 of FIG. 5. Routine 280 determines in block 282 whether online processing has been aborted for the voice input, and if not, passes control to block 284 to send the digital audio data for the next portion of the voice input to the online service, whereby routine 280 is complete. If, however, online processing has been aborted, block 284 is bypassed, and routine 280 terminates without uploading the digital audio data to the online service.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   receiving a voice input with a voice-enabled electronic device; and in the voice-enabled electronic device, and responsive to receiving at least a portion of the voice input:
  initiating both local processing of the at least a portion of the voice input in the voice-enabled electronic device and online processing of the at least a portion of the voice input by the online voice-based query processor in response to receiving the at least a portion of the voice input;
  performing local processing of the at least a portion of the voice input to dynamically build at least a portion of a voice action prior to completely receiving the voice input with the voice-enabled electronic device;
  determining during the local processing and after initiating the online processing whether the voice action can be completed by the local processing without data received from the online voice-based query processor;
  in response to a determination that the voice action can be completed by the local processing without data received from the online voice-based query processor, aborting online processing of the at least a portion of the voice input by the online voice-based query processor and completing building of the voice action with the local processing; and
  after aborting online processing and completing building of the voice action with the local processing, receiving data from the online voice-based query processor, verifying the voice action based upon the data received from the online voice-based query processor, and if not verified, updating the voice action using at least a portion of the data received from the online voice-based query processor.

2. The method of claim 1, wherein the voice-enabled electronic device comprises a mobile device configured to communicate with the online voice-based query processor when in communication with a wireless network.

3. The method of claim 1, wherein performing the local processing of the portion of the voice input includes:
  converting a digital audio signal of the voice input to text using a streaming voice to text module of the voice-enabled electronic device, wherein the streaming voice to text module dynamically generates a plurality of text tokens from the digital audio signal; and
  dynamically building the portion of the voice action from at least a portion of the plurality of text tokens using a streaming semantic processor of the voice-enabled electronic device.

4. The method of claim 1, wherein initiating online processing includes sending data associated with the voice input to the online voice-based query processor.

5. The method of claim 4, wherein sending the data comprises sending at least a portion of a digital audio signal of the voice input, wherein the online voice-based query processor is configured to perform voice to text conversion and semantic processing of the portion of the digital audio signal to generate an online action for the voice input.

6. The method of claim 4, wherein performing the local processing of the portion of the voice input includes generating a plurality of text tokens from a digital audio signal of the voice input, wherein sending the data comprises sending at least a portion of the plurality of text tokens to the online voice-based query processor, and wherein the online voice-based query processor is configured to perform voice to text conversion and semantic processing of the portion of the digital audio signal to generate an online action for the voice input.

7. The method of claim 1, wherein aborting online processing of the portion of the voice input by the online voice-based query processor includes sending data to the online voice-based query processor to terminate online processing of the portion of the voice input by the online voice-based query processor.

8. The method of claim 1, wherein aborting online processing of the portion of the voice input by the online voice-based query processor includes disregarding a response received from the online voice-based query processor.

9. The method of claim 1, wherein aborting online processing of the portion of the voice input by the online voice-based query processor includes bypassing sending of data associated with the voice input to the online voice-based query processor.

10. The method of claim 1, wherein determining during the local processing whether the voice action can be completed by the local processing without data received from the online voice-based query processor includes determining whether an action requested by the voice input can be performed locally in the voice-enabled electronic device.

11. The method of claim 1, further comprising, in response to a determination that the voice action cannot be completed by the local processing without data received from the online voice-based query processor:
  deferring completing building of the voice action with the local processing until reception of a response from the online voice-based query processor; and
  completing building of the voice action using data from the response.

12. The method of claim 11, further comprising, in response to the determination that the voice action cannot be completed by the local processing without data received from the online voice-based query processor, querying the online voice-based query processor for the data.

13. The method of claim 1, wherein updating the voice action includes correcting the voice action in the voice-enabled electronic device in response to a failure to verify the voice action based upon the data received from the online voice-based query processor.

14. An apparatus including memory and one or more processors operable to execute instructions stored in the memory, comprising instructions to:
  receive a voice input with a voice-enabled electronic device; and
  in the voice-enabled electronic device, and responsive to receiving at least a portion of the voice input:
    initiate both local processing of the at least a portion of the voice input in the voice-enabled electronic device and online processing of the at least a portion of the voice input by the online voice-based query processor in response to receiving the at least a portion of the voice input;
    perform local processing of the at least a portion of the voice input to dynamically build at least a portion of a voice action prior to completely receiving the voice input with the voice-enabled electronic device;
    determine during the local processing and after initiating the online processing whether the voice action can be completed by the local processing without data received from the online voice-based query processor;
    in response to a determination that the voice action can be completed by the local processing without data received from the online voice-based query processor, abort online processing of the at least a portion of the voice input by the online voice-based query processor and complete building of the voice action with the local processing; and after aborting online processing and completing building of the voice action with the local processing, receive data from the online voice-based query processor, verify the voice action based upon data received from the online voice-based query processor, and if not verified, update the voice action using at least a portion of the data received from the online voice-based query processor.

15. The apparatus of claim 14, wherein the instructions include:

first instructions implementing a streaming voice to text module that converts a digital audio signal of the voice input to text, wherein the first instructions dynamically generate a plurality of text tokens from the digital audio signal; and second instructions implementing a streaming semantic processor that dynamically builds the portion of the voice action from at least a portion of the plurality of text tokens.

16. The apparatus of claim 14, wherein the instructions that abort online processing of the portion of the voice input by the online voice-based query processor send data to the online voice-based query processor to terminate online processing of the portion of the voice input by the online voice-based query processor.

17. The apparatus of claim 14, wherein the instructions that abort online processing of the portion of the voice input by the online voice-based query processor disregard a response received from the online voice-based query processor.

18. The apparatus of claim 14, wherein the instructions that abort online processing of the portion of the voice input by the online voice-based query processor bypass sending of data associated with the voice input to the online voice-based query processor.

19. A non-transitory computer readable storage medium storing computer instructions executable by one or more processors to perform a method comprising:

receiving a voice input with a voice-enabled electronic device; and in the voice-enabled electronic device, and responsive to receiving at least a portion of the voice input:

initiating both local processing of the at least a portion of the voice input in the voice-enabled electronic device and online processing of the at least a portion of the voice input by the online voice-based query processor in response to receiving the at least a portion of the voice input;

performing local processing of the at least a portion of the voice input to dynamically build at least a portion of a voice action prior to completely receiving the voice input with the voice-enabled electronic device;

determining during the local processing and after initiating the online processing whether the voice action can be completed by the local processing without data received from the online voice-based query processor;

in response to a determination that the voice action can be completed by the local processing without data received from the online voice-based query processor, aborting online processing of the at least a portion of the voice input by the online voice-based query processor and completing building of the voice action with the local processing; and after aborting online processing and completing building of the voice action with the local processing, receiving data from the online voice-based query processor, verifying the voice action based upon the data received from the online voice-based query processor, and if not verified, updating the voice action using at least a portion of the data received from the online voice-based query processor.

* * * * *